US009892036B2

(12) United States Patent
Shin

(10) Patent No.: US 9,892,036 B2
(45) Date of Patent: Feb. 13, 2018

(54) APPARATUS AND METHOD OF CONVERTING ADDRESS AND DATA OF MEMORY IN A TERMINAL

(71) Applicant: Samsung Electronics Co., Ltd, Gyeonggi-do (KR)

(72) Inventor: Hee-Sub Shin, Yongin-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 858 days.

(21) Appl. No.: 14/149,665

(22) Filed: Jan. 7, 2014

(65) Prior Publication Data

US 2014/0195724 A1   Jul. 10, 2014

(30) Foreign Application Priority Data

Jan. 7, 2013 (KR) .................. 10-2013-0001542

(51) Int. Cl.
| | |
|---|---|
| *G06F 3/00* | (2006.01) |
| *G06F 12/14* | (2006.01) |
| *G06F 12/06* | (2006.01) |
| *G06F 12/02* | (2006.01) |
| *G11C 14/00* | (2006.01) |
| *G06F 21/85* | (2013.01) |

(52) U.S. Cl.
CPC ...... *G06F 12/0638* (2013.01); *G06F 12/0238* (2013.01); *G06F 12/0246* (2013.01); *G06F 12/1408* (2013.01); *G06F 21/85* (2013.01); *G11C 14/0081* (2013.01)

(58) Field of Classification Search
CPC ............. G06F 21/10; G06F 2221/2101; G06F 2221/2135; G06F 2221/0737
USPC .......................................................... 710/62
See application file for complete search history.

(56) References Cited

U.S. PATENT DOCUMENTS

| | | | |
|---|---|---|---|
| 2005/0154912 A1 | 7/2005 | Kim et al. | |
| 2008/0072070 A1* | 3/2008 | LaMacchia | ............. G06F 21/10 713/193 |
| 2008/0301467 A1 | 12/2008 | Saito | |
| 2009/0100245 A1 | 4/2009 | Wang et al. | |

(Continued)

FOREIGN PATENT DOCUMENTS

| | | |
|---|---|---|
| CN | 1641717 A | 7/2005 |
| CN | 102204158 A | 9/2011 |

(Continued)

OTHER PUBLICATIONS

Extended European Search Report in connection with European Patent Application No. 14150275.7, dated May 28, 2014, 7 pages.
International Search Report in connection with International Patent Application No. PCT/KR2014/000155, dated Apr. 29, 2014, 4 pages.

(Continued)

*Primary Examiner* — Titus Wong

(57) ABSTRACT

An apparatus and method of converting an address and data of a memory in a terminal. The apparatus includes a random key generator configured to generate a new random key, each time the terminal is powered on, an address mapper configured to convert an address of a memory area for data writing or reading using the random key and transmit the converted address to a data converter, and the data converter configured to convert data to be written to the memory using the converted address and convert data to read from the memory using the converted address to original data.

40 Claims, 9 Drawing Sheets

(56) References Cited

U.S. PATENT DOCUMENTS

| | | | |
|---|---|---|---|
| 2009/0132836 A1* | 5/2009 | Mera | H04L 63/08 713/310 |
| 2010/0023675 A1 | 1/2010 | Chen et al. | |
| 2010/0088467 A1 | 4/2010 | Lee et al. | |
| 2010/0115286 A1 | 5/2010 | Hawkes et al. | |
| 2010/0191897 A1 | 7/2010 | Zhang et al. | |
| 2010/0205363 A1 | 8/2010 | Hwang et al. | |
| 2012/0290781 A1 | 11/2012 | Seo et al. | |
| 2013/0145177 A1* | 6/2013 | Cordella | G06F 12/1408 713/193 |
| 2013/0332690 A1 | 12/2013 | Seo et al. | |
| 2014/0037086 A1* | 2/2014 | Seol | G06F 7/58 380/44 |
| 2014/0037093 A1* | 2/2014 | Park | H04L 9/0894 380/277 |

FOREIGN PATENT DOCUMENTS

| | | |
|---|---|---|
| JP | 2008-287803 | 11/2008 |
| WO | WO 2012/047200 A1 | 4/2012 |

OTHER PUBLICATIONS

Written Opinion of the International Searching Authority for International Patent Application No. PCT/KR2014/000155, dated Apr. 29, 2014, 7 pages.

Dongyoung Seo, "W-Buddy: Wear-Out-Aware Memory Allocator for SCRAM-based Low Power Mobile Systems", IEEE Global Conference on Consumer Electronics, Oct. 2012, 2 pages.

Foreign Communication From a Related Counterpart Application, Chinese Application No. 201480004209.3, First Office Action dated Dec. 21, 2016, 28 pages.

\* cited by examiner

APPARATUS AND METHOD OF CONVERTING ADDRESS AND DATA OF MEMORY IN A TERMINAL

CROSS-REFERENCE TO RELATED APPLICATION(S) AND CLAIM OF PRIORITY

The present application is related to and claims the benefit under 35 U.S.C. §119(a) of a Korean patent application filed on Jan. 7, 2013 in the Korean Intellectual Property Office and assigned Serial No. 10-2013-0001542, the entire disclosure of which is incorporated hereby by reference.

TECHNICAL FIELD

The present disclosure relates to an apparatus and method of converting addresses and data of a memory in a terminal. More particularly, the present disclosure relates to an apparatus and method of converting addresses and data of a memory in a terminal in such a manner that the entire area of the memory may be uniformly worn and data may be protected.

BACKGROUND

Volatile memories such as Dynamic Random Access Memory (DRAM) and Static Random Access Memory (SRAM) are generally used as a main memory and a cache memory. Owing to their benefits of random access and fast operation, the volatile memories are feasible for storing code and data to be processed in a Central Processing Unit (CPU). However, if power is not supplied to the volatile memories, stored data is erased from the volatile memories, which makes the volatile memories unviable for long-term data storage. Therefore, a non-volatile memory such as a hard disk or a flash memory is used for data storage. Despite impossible random access and slow operation (relative to a volatile memory), the non-volatile memory is suitable for storing a large amount of data permanently.

Non-Volatile RAMs (NVRAMs) have recently been commercialized. The NVRAMs include Phase-change RAM (PRAM), Magnetic RAM (MRAM), and the like. The NVRAM is randomly accessible on a byte basis like the DRAM and also has the non-volatile memory property of permanent data storage.

In other words, while the NVRAM is identical to the DRAM in functional features, the NVRAM preserves data despite power-off. Particularly, the MRAM has a higher integration level per unit silicon area than the SRAM and the DRAM. Therefore, the MRAM is cost-effective. It is expected that the DRAM and the SRAM will give way to the MRAM in view of the advantages of the MRAM.

Although the recent NVRAM will substitute for the DRAM, the NVRAM faces some challenging issues.

The memory cells of the NVRAM are worn out by programming and erasure. As compared to the DRAM that offers an almost infinite number of write operations, the NVRAM allows only a limited number of write operations because the memory cells are worn out due to repeated writes to the NVRAM. The PRAM guarantees about $10^8$ writes, the FeRAM guarantees about $10^{12}$ writes, and the MRAM guarantees about $10^{14}$ writes.

Wear leveling is a technique of arranging data so that erasures and re-writes are distributed evenly across all cells of a memory by preventing a high concentration of write cycles in specific cells in consideration of the service life of the memory.

A kind of volatile memory, NAND flash prevents excess erasures of a specific memory block by managing blocks and pages through a flash conversion layer, so that every memory block is evenly used. For this purpose, the flash conversion layer records and manages the count of erasures of each block.

If the NVRAM is used as a main memory, instead of the DRAM, this is problematic because the Operating System (OS) and higher application-layer software of a computer system such as an existing portable terminal give no regard to wear leveling.

While the NVRAM ensures relatively high endurance, wear leveling may be considered to prolong the life of the NVRAM in order to substitute the NVRAM for the DRAM.

When the NVRAM is powered off and then powered on, data written on the NVRAM is generally erased. However, some data may still remain on the NVRAM.

If the remaining data is significant information such as a password, the information may risk exposure to an unauthorized third party.

The above information is presented as background information only to assist with an understanding of the present disclosure. No determination has been made, and no assertion is made, as to whether any of the above might be applicable as prior art with regard to the present disclosure.

SUMMARY

To address the above-discussed deficiencies, it is a primary object to provide an apparatus and method of converting an address and data of a memory in a terminal so that all areas of the memory may be evenly worn.

Another aspect of the present disclosure is to provide an apparatus and method of converting an address and data of a memory in terminal, which perform wear leveling so that all areas of the memory may be worn evenly, when an NVRAM is used as a main memory in the terminal.

Another aspect of the present disclosure is to provide an apparatus and method of converting an address and data of a memory in a terminal, which can protect data written on an NVRAM.

Another aspect of the present disclosure is to provide an apparatus and method of converting an address and data of a memory in a terminal, which can protect data remaining on an NVRAM when the NVRAM is powered off and then on.

In accordance with an aspect of the present disclosure, an apparatus of converting a memory address in a terminal is provided. The apparatus includes a random key generator configured to generate a new random key, each time the terminal is powered on, and an address mapper configured to convert an address of a memory area for data writing or reading using the random key and transmit the converted address to a memory, to write data to or read data from a memory area corresponding to the converted address.

In accordance with another aspect of the present disclosure, an apparatus of converting an address and data of a memory in a terminal is provided. The apparatus includes a random key generator configured to generate a new random key, each time the terminal is powered on, an address mapper configured to convert an address of a memory area for data writing or reading using the random key and transmit the converted address to a data converter, and the data converter configured to convert data to be written to the memory using the converted address and convert data to read from the memory using the converted address to original data.

In accordance with another aspect of the present disclosure, an apparatus of converting an address and data of a memory in a terminal is provided. The apparatus includes a processor configured to transmit data to be written to the memory and an address of a memory area for data writing or reading to a conversion unit, the conversion unit configured to convert the address of the memory area for data writing or reading using a random key that is generated each time the terminal is powered on, transmit the converted address to the memory, convert the data to be written to the memory, transmit the converted data to the memory, and return converted data read from the memory to original data, and the memory configured to write the converted data received from the conversion unit in a memory area corresponding to the converted address received from the conversion unit, extract the converted data from the memory area corresponding to the converted address received from the conversion unit, and transmit the extracted data to the conversion unit.

In accordance with another aspect of the present disclosure, a method of converting an address of a memory in a terminal is provided. The method includes generating a new random key, when the terminal is powered on, converting an address of a memory area for data writing or reading using the random key, and writing data to or reading data from a memory area corresponding to the converted address.

In accordance with another aspect of the present disclosure, a method of converting an address and data of a memory in a terminal is provided. The method includes generating a new random key, when the terminal is powered on, converting an address of a memory area for data writing or reading using the random key, converting data to be written to the memory using the converted address and writing the converted data in a memory area corresponding to the converted address, upon request of data writing, and extracting the converted data from the memory area corresponding to the converted address and converting the extracted data to original data, upon request of data reading.

Other aspects, advantages, and salient features of the disclosure will become apparent to those skilled in the art from the following detailed description, which, taken in conjunction with the annexed drawings, discloses exemplary embodiments of the disclosure.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components, and structures.

DETAILED DESCRIPTION

Figure 1:
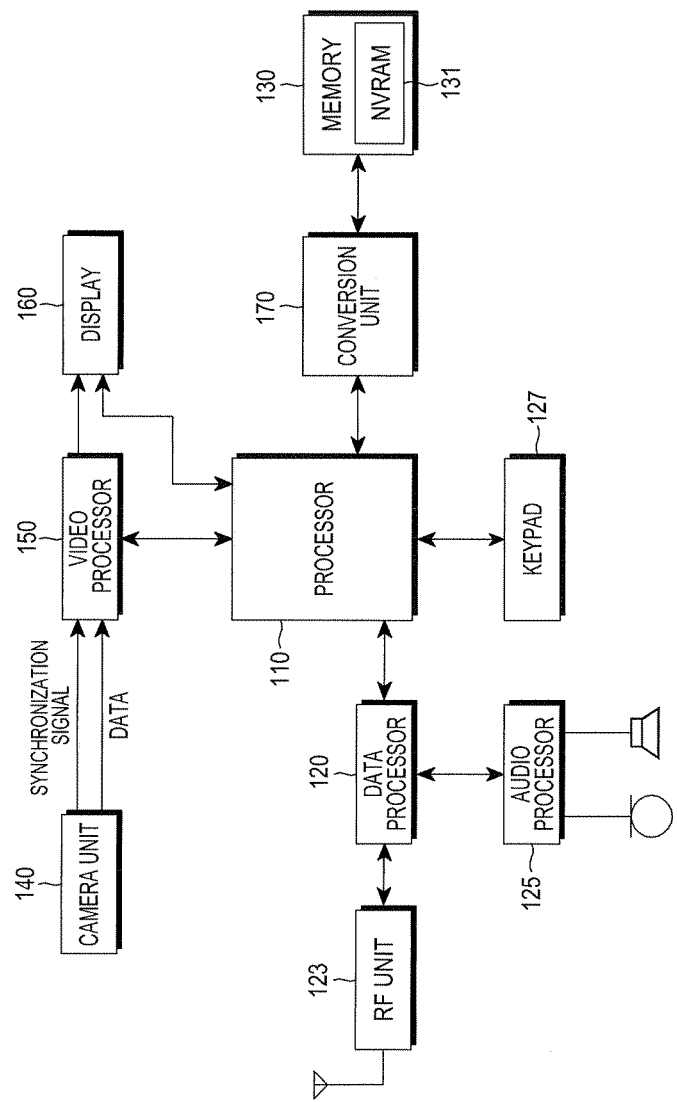
FIG. 1 illustrates a block diagram of a terminal according to an exemplary embodiment of the present disclosure.

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device. The following description with reference to the accompanying drawings is provided to assist in a comprehensive understanding of exemplary embodiments of the disclosure as defined by the claims and their equivalents. The present disclosure includes various specific details to assist in that understanding but these are to be regarded as merely exemplary. Accordingly, those of ordinary skill in the art will recognize that various changes and modifications of the embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of exemplary embodiments of the present disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present disclosure will be provided to achieve the above-described technical aspects of the present disclosure. In an exemplary implementation, defined entities may have the same names, to which the present disclosure is not limited. Thus, exemplary embodiments of the present disclosure can be implemented with same or ready modifications in a system having a similar technical background.

In exemplary embodiments of the present disclosure, a terminal may be portable or fixed. A portable terminal is an electronic device that is readily carried with a user, such as a video phone, a portable phone, a smart phone, an International Mobile Telecommunication 2000 (IMT-2000) terminal, a Wideband Code Division Multiple Access (WCDMA) terminal, a Universal Mobile Telecommunication System (UMTS) terminal, a Personal Digital Assistant (PDA), a Portable Multimedia Player (PMP), a Digital Multimedia Broadcasting (DMB) terminal, an e-book reader, a laptop computer, a tablet, or a digital camera. The fixed terminal may be, for example, a desktop Personal Computer (PC).

FIG. 1 illustrates a block diagram of a terminal according to an exemplary embodiment of the present disclosure.

Referring to FIG. 1, a Radio Frequency (RF) unit 123 performs a wireless communication function of the terminal. The RF unit 123 includes an RF transmitter that upconverts the frequency of a transmission signal and amplifies the upconverted transmission signal and an RF receiver that low-noise-amplifies a received signal and downcoverts the frequency of the low-noise-amplified signal. A data processor 120 includes a transmitter that encodes and modulates the transmission signal and a receiver that demodulates and decodes the received signal. Thus the data processor 120 may include a Modulation-Demodulator (MODEM) and a Coder-Decoder (CODEC). The CODEC includes a data CODEC that processes packet data and an audio CODEC that processes an audio signal such as voice. An audio processor 125 reproduces an audio signal received from the audio CODEC or transmits a transmission audio signal generated from a microphone to the audio CODEC of the data processor 120.

A keypad 127 includes alphanumerical keys used to input numerals and characters and function keys used to set various functions.

A camera unit 140 includes a camera sensor that captures image data and converts the captured optical signal to an electrical signal and a signal processor that converts an analog image signal captured by the camera sensor to digital data. The camera sensor may be a Charge Coupled Device (CCD) sensor or a Complementary Metal Oxide Semiconductor (CMOS) sensor, and the signal processor may include a Digital Signal Processor (DSP). The camera sensor and the signal processor may be incorporated into a single device or may be configured separately.

A video processor 150 performs Image Signal Processing (ISP) to display an image signal received from the camera unit 140 on a display 160. The ISP includes image processing functions such as gamma correction, interpolation, spatial change, image effect, image scaling, Automatic White Balance (AWB), Automatic Exposure (AE), and Automatic Focus (AF). The video processor 150 processes the image signal received from the camera unit 140 on a frame-by-frame basis and outputs the frame image data according to the characteristics and size of the display 160. The video processor 150 includes a video CODEC to compress frame image data displayed on the display 160 in a predetermined method and recovers (or decompress) compressed frame image data to original frame image data. The video CODEC may be a Joint Photographic Experts Group (JPEG) CODEC, a Moving Picture Experts Group 4 (MPEG4) CODEC, a Wavelet CODEC, or the like. The video processor 150 is assumed to have an On Screen Display (OSD) function, and may output OSD data according to the size of a displayed screen under control of a processor 110.

The display 160 displays an image signal received from the video processor 150 on a screen, and displays user data received from the processor 110. The display 160 may be configured with a Liquid Crystal Display (LCD). In this case, the display 160 may include an LCD controller, a memory that stores image data, and an LCD device. If the LCD is configured as a touch screen, the LCD may serve as an input unit. In this case, virtual keys on the keypad 127 may be displayed on the display 160.

The processor 110 provides overall control to the terminal.

In an exemplary embodiment of the present disclosure, upon receipt of a data write/read request along with execution of a specific application, the processor 110 transmits a first address value of a memory area to which or from which data will be written or read to a conversion unit 170.

In the exemplary embodiment of the present disclosure, the conversion unit 170 converts the first address value received from the processor 110 to a second address value using a random key and transmits the second address value to a non-volatile memory, for example, a Non-Volatile Random Access Memory (NVRAM) 131 of a memory 130.

In the exemplary embodiment of the present disclosure if the first address value is a predetermined address excluded from address conversion, the conversion unit 170 transmits the received first address value to the Non-Volatile Random Access Memory (NVRAM) 131 of the memory 130, without address conversion.

In another exemplary embodiment of the present disclosure, upon receipt of first data to be written and a first address value of a memory area in which the first data is to be written from the processor 110, the conversion unit 170 converts the first address value to a second address value using a random key and converts the first data to the second data using the second address value.

The conversion unit 170 transmits the second data and the second address value for use in writing the second data to the NVRAM 131 of the memory 130.

In the second exemplary embodiment of the present disclosure, upon receipt of a first address value for use in reading the first data from the processor 110, the conversion unit 170 converts the first address value to a second address value using a random key and transmits the second address value to the NVRAM 130 in order to read the first data. Upon receipt of second data written at the second address value from the NVRAM 130, the conversion unit 170 converts the second data to the first data using the second address value and transmits the first data to the processor 110.

The memory 130 may include a program memory and a data memory. The program memory may store programs to control general operations of the terminal. The program memory may store a program that controls mapping of a first address value of a specific memory area to which or from which data will be written or read to a second address value and controls writing or reading of data to or from a specific memory area corresponding to the second address value, so that all cells of the NVRAM 131 may be evenly worn according to an exemplary embodiment of the present disclosure. In accordance with an exemplary embodiment of the present disclosure, the program memory may store a program that controls mapping of first data to second data using a second address value, writing of the second data to the NVRAM 131, conversion of the second data written in the NVRAM 131 to the first data, and reading of the first data, in order to protect data in the NVRAM 131.

The data memory temporarily stores data generated during execution of the above-described programs.

The memory 130 includes a volatile memory and a non-volatile memory. If an NVRAM is used as a main memory, wear leveling is performed to wear all cells of the NVRAM evenly in the present disclosure.

In the first exemplary embodiment of the present disclosure, upon receipt of a second address value from the conversion unit 170, the NVRAM 131 writes or reads data to or from a memory area corresponding to the second address value.

In the first exemplary embodiment of the present disclosure, upon receipt of a first address value from the conversion unit 170, the NVRAM 131 writes or reads data to or from a memory area corresponding to the first address value.

In the second exemplary embodiment of the present disclosure, upon receipt of a second address value and second data from the conversion unit 170, the NVRAM 131 writes the second data to a memory area corresponding to the second address value. Upon receipt of a request of reading data corresponding to a second address value from the conversion unit 170, the NVRAM 131 reads second data from a memory area corresponding to the second address value and transmits the second data to the conversion unit 170.

In the second exemplary embodiment of the present disclosure, upon receipt of a first address value and second data from the conversion unit 170, the NVRAM 131 writes the second data to a memory area corresponding to the first address value. Upon receipt of a request of reading data corresponding to a first address value from the conversion unit 170, the NVRAM 131 reads second data from a memory area corresponding to the first address value and transmits the second data to the conversion unit 170.

Operations of performing wear leveling on the NVRAM 131 by mapping a first address value of a memory area for data writing or reading to a second address value through the conversion unit 170 will be described in detail with reference to FIGS. 2 to 5.

Figure 2:
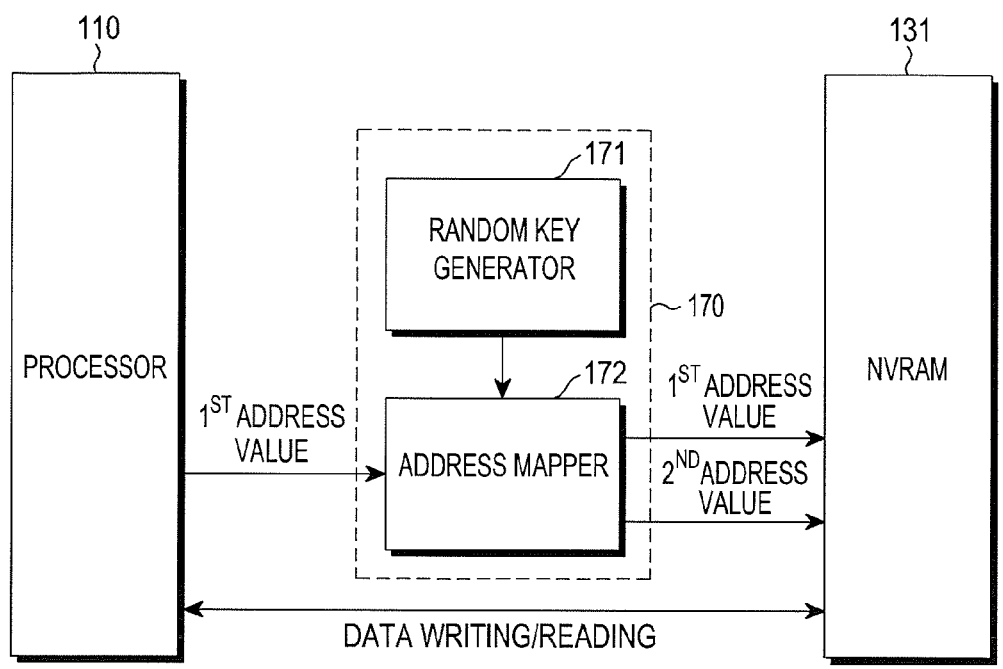
FIG. 2 illustrates a block diagram of an apparatus of converting an address of a memory in a terminal according to an exemplary embodiment of the present disclosure.

FIG. 2 illustrates a block diagram of an apparatus of converting a memory address according to an exemplary embodiment of the present disclosure.

Referring to FIG. 2, the memory address conversion apparatus of the terminal includes the processor 110, the conversion unit 170, and the NVRAM 131.

Upon receipt of a data write/read request along with execution of a specific application, the processor 110 transmits an address of a specific memory area of the NVRAM 131 for data writing or reading to the conversion unit 170.

The conversion unit 170 includes a random key generator 171 and an address mapper 172.

Each time the terminal is powered on, the random key generator 171 generates a new random key and transmits the new random key to the address mapper 172. The random key may be a number.

If the terminal is powered on in a power saving mode, the random key generator 172 may not generate a new random key or may generate the same random key as a previous random key and transmit the generated random key to the address mapper 172. Like hibernation, a current state is written to a memory and then the terminal is powered off in the power saving mode. Then when the terminal is powered on again, the written data is all read and recovered, thus returning the memory to an original state. In addition, on-going programs still run as if nothing occurred.

Accordingly, when the terminal is powered on in the power saving mode, the random key generator 171 may not generate a new random key or may generate the same random key as a previous random key and transmit the generated random key to the address mapper 172.

The address mapper 172 receives the random key from the random key generator 171. Upon receipt of the first address value of the specific memory area for data writing or reading from the processor 110, the address mapper 172 converts the first address value to a second address value using the random key and transmits the second address value to the NVRAM 131.

The second address value may be created using the random key by the following equation:

$$\text{Second address value} = (\text{first address value} + \text{random key})\% (\text{total memory address range}) \quad (1).$$

For example, if a first address value of a specific memory for data writing or reading is '7', a current random key is '8', and a total address range of the NVRAM is '10', the first address value '7' is mapped to a second address value '5' by equation (1).

The address mapper 172 converts the first address value to the second address value in a one-to-one correspondence using the random key received from the random key generator 171, so that first address values are not converted to second address values in an overlapped manner.

That is, once the first address value '7' is mapped to the second address value '5', the address mapper 172 converts another first address value to a second address value other than '5' in a one-to-one correspondence using a random key.

Each time the address mapper 172 receives a random key from the random key generator 171, the address mapper 172 converts the first address value to a different second address value using the received random key. As the random key generator 171 generates a random key in every power cycle, the address mapper 172 receives a new random key from the random key generator 171 and thus converts the first address value of the memory area to a new second address value using the new random key, for data writing or reading.

If the address mapper 172 does not receive a random key from the random key generator 171, the address mapper 172 performs address mapping using a previous random key.

If a first address value of a memory area which data is to be written to or read from, received from the processor 110 is a predetermined address indicating a predetermined memory area in which a basic program such as firmware is to be stored, the address mapper 172 simply outputs the first address value to the NVRAM 131, without address conversion.

Upon receipt of a second address value from the conversion unit 170, the NVRAM 131 writes data to or reads data from a memory area corresponding to the second address value.

Upon receipt of a first address value from the conversion unit 170, the NVRAM 131 writes data to or reads data from a memory area corresponding to the first address value.

The conversion unit 170 may be configured separately or incorporated into the processor 110 or the NVRAM 131.

If the conversion unit 170 is incorporated into the processor 110, the processor 110 converts a first address value of a memory area for data writing or reading to a second address value through the conversion unit 170 and transmits the second address value to the NVRAM 131. If the first address value of the memory area is a predetermined address excluded from address conversion, the processor 110 transmits the first address value to the NVRAM 131, without address conversion.

Upon receipt of the first address value or the second address value from the processor 110, the NVRAM 131 writes data to or reads data from the memory area corresponding to the first address value or the second address value.

If the conversion unit 170 is incorporated into the NVRAM 131, the processor 110 transmits a first address value of a memory area for data writing or reading to the NVRAM 131.

Upon receipt of the first address value of the memory area from the processor 110, the NVRAM 131 converts the first address value to a second address value through the conversion unit 170 and writes data to or reads data from a memory area corresponding to the second address value.

If the first address value of the memory area is a predetermined address excluded from address conversion, the NVRAM 131 writes data to or reads data from the memory area corresponding to the first address value, without address conversion.

In the case where the conversion unit 170 is configured separately in the terminal as illustrated in FIG. 2, operations of converting an address of an NVRAM will be described in greater detail with reference to FIGS. 3, 4 and 5.

Figure 3:
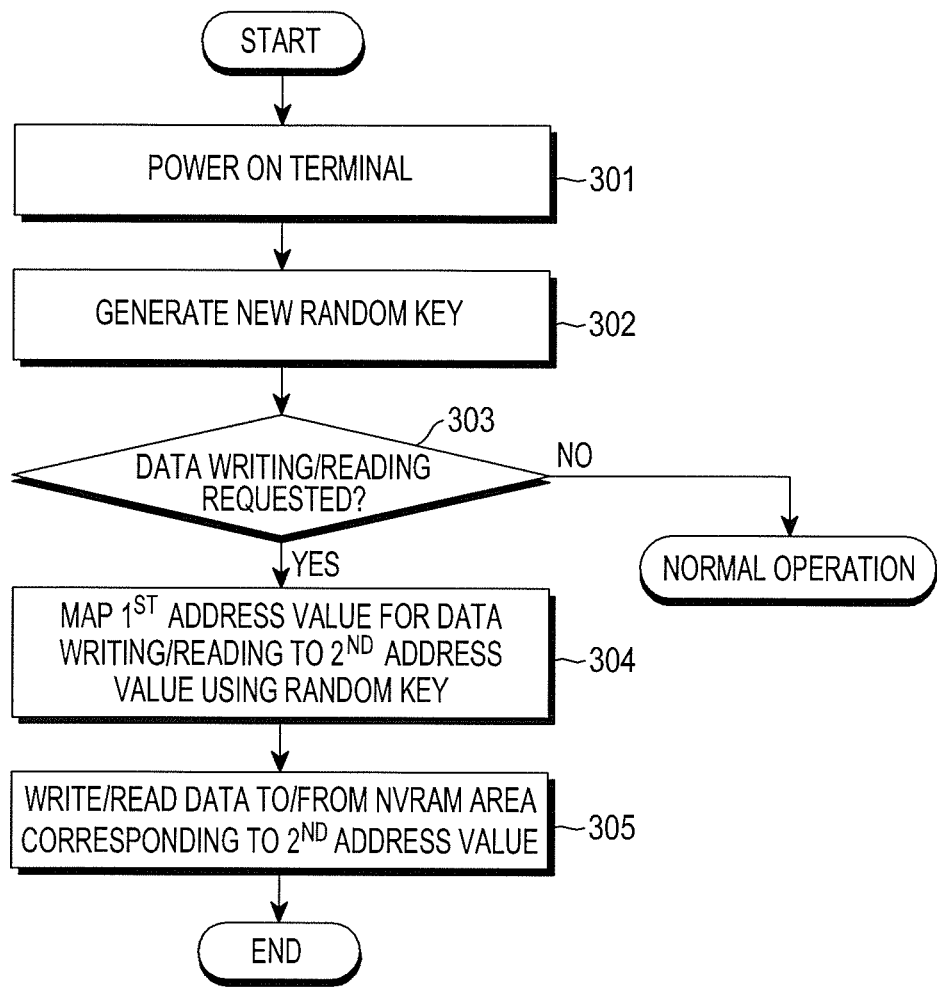
FIG. 3 illustrates a flowchart for a first memory address conversion operation in a terminal according to the exemplary embodiment of the present disclosure.

FIG. 3 illustrates a flowchart for a first memory address conversion operation in a terminal according to the first exemplary embodiment of the present disclosure.

The first memory address conversion operation according to the first exemplary embodiment of the present disclosure will be described in detail with additional reference to FIGS. 1 and 2.

Referring to FIG. 3, upon power-on of the terminal in step 301, the random key generator 171 generates a new random key and transmits the new random key to the address mapper 172 in step 302.

Upon receipt of a data write/read request along with execution of a specific application in step 303, the processor 110 transmits a first address value of a memory area for data writing or reading to the address mapper 172 of the conversion unit 170.

The address mapper 172 converts the first address value to a second address value using the random key received in step 302, for example, by equation (1) in step 304.

The address mapper 172 transmits the second address value to the NVRAM 131 and the NVRAM 131 writes data to or reads data from a memory area corresponding to the second address value in step 305.

According to the operation of FIG. 3, since a new random key is generated in every power cycle and an address of an NVRAM for data writing or reading is converted to another address using the random key, the areas of the NVRAM are evenly worn by wear leveling.

Figure 4:
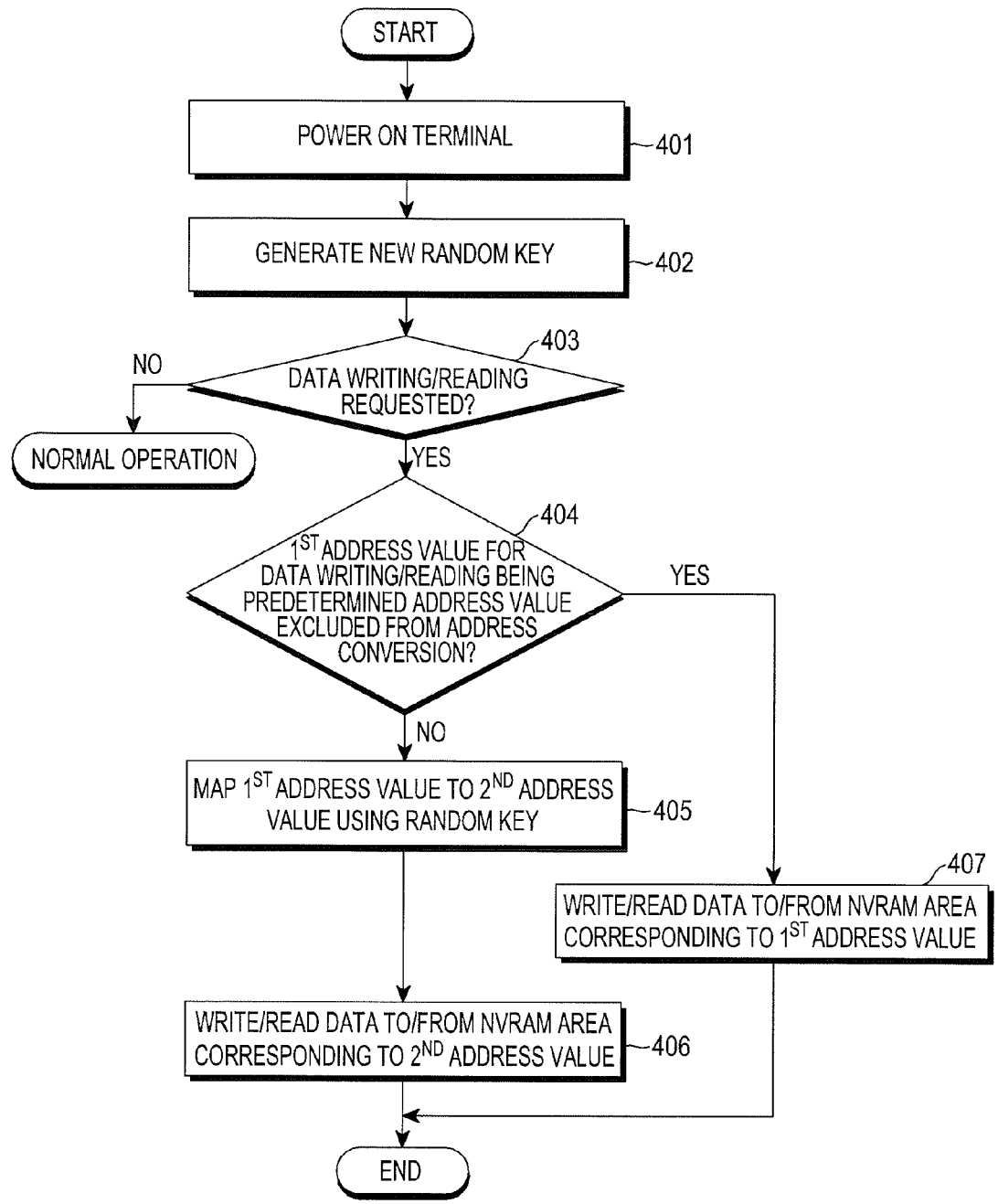
FIG. 4 illustrates a flowchart for a second memory address conversion operation in a terminal according to the exemplary embodiment of the present disclosure.

FIG. 4 illustrates a flowchart for a second memory address conversion operation in a terminal according to the first exemplary embodiment of the present disclosure.

The second memory address conversion operation according to the first exemplary embodiment of the present disclosure will be described in detail with additional reference to FIGS. 1 and 2.

Referring to FIG. 4, upon power-on of the terminal in step 401, the random key generator 171 generates a new random key and transmits the new random key to the address mapper 172 in step 402.

Upon receipt of a data write/read request along with execution of a specific application in step 403, the processor 110 determines whether a first address value of a memory area which data will be written to or read from is a predetermined address excluded from address conversion in step 404.

If the first address value is not a predetermined address excluded from address mapping in step 404, the processor 110 transmits the first address value to the address mapper 172 of the conversion unit 170.

The address mapper 172 converts the first address value to a second address value using the random key received in step 402, for example, by equation (1) in step 405.

The address mapper 172 transmits the second address value to the NVRAM 131 and the NVRAM 131 writes data to or reads data from a memory area corresponding to the second address value in step 406.

On the other hand, if the first address value is a predetermined address excluded from address conversion in step 404, the processor 110 transmits the first address value directly to the NVRAM 131, not to the address mapper 172 of the conversion unit 170.

Then, the NVRAM 131 writes data to or reads data from the memory area corresponding to the first address value in step 407.

According to the operation of FIG. 4, since a new random key is generated in every power cycle and an address of an NVRAM for data writing or reading is converted to another address using the random key, the areas of the NVRAM are evenly worn by wear leveling. Furthermore, if data writing to or data reading from a specific memory area preset to store a basic program such as firmware has been requested, the address of the specific memory area of the NVRAM 131 is directly provided to the NVRAM 131, without being converted to another address. Therefore, the address of an area preset for a basic program of the terminal is kept unchanged.

Figure 5:
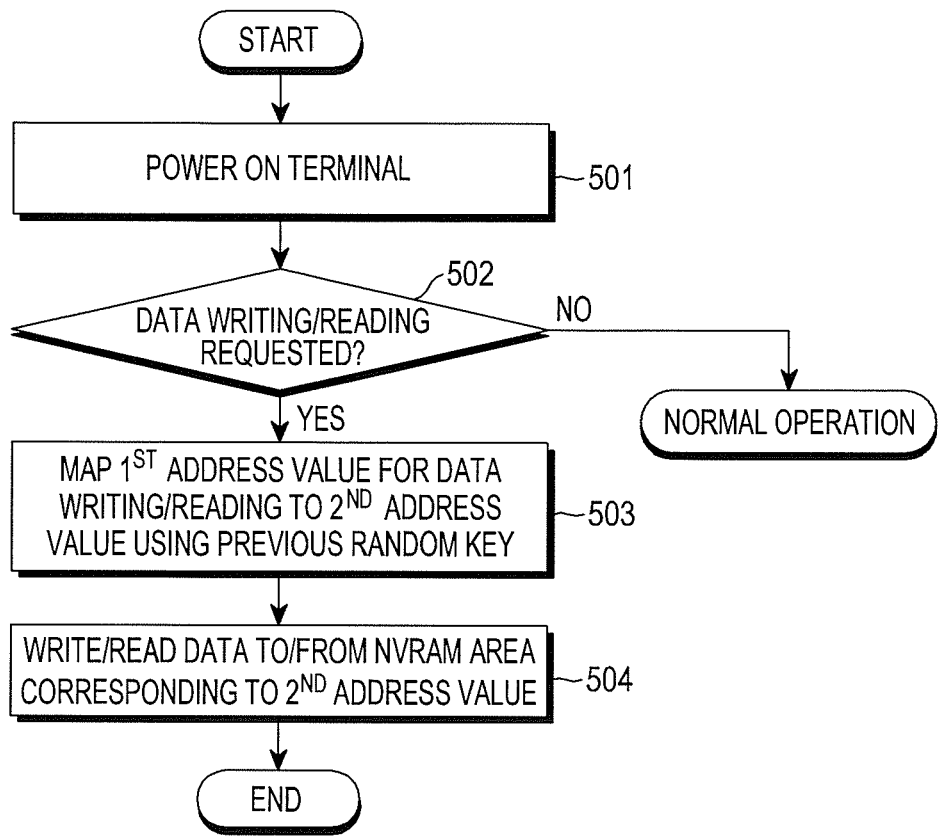
FIG. 5 illustrates a flowchart for a third memory address conversion operation in a terminal according to the exemplary embodiment of the present disclosure.

FIG. 5 illustrates a flowchart for a third memory address conversion operation in a terminal according to the first exemplary embodiment of the present disclosure.

The third memory address conversion operation according to the first exemplary embodiment of the present disclosure will be described in detail with additional reference to FIGS. 1 and 2.

Referring to FIG. 5, upon power-on of the terminal in a power-saving mode in step 501, the random key generator 171 does not generate a new random key or generates the same random key as a previous random key and transmits the random key to the address mapper 172.

Upon receipt of a data write/read request along with execution of a specific application in step 502, the processor 110 transmits a first address value of a memory area which data will be written to or read from to the address mapper 172 of the conversion unit 170.

The address mapper 172 converts the first address value to a second address value using the previous random key or the random key received in step 402, for example, by equation (1) in step 503.

The address mapper 172 transmits the second address value to the NVRAM 131 and the NVRAM 131 writes data to or reads data from a memory area corresponding to the second address value in step 504.

On the other hand, if the first address value is a predetermined address excluded from address conversion, the processor 110 transmits the first address value directly to the NVRAM 131, not to the address mapper 172 of the conversion unit 170. Then, the NVRAM 131 writes data to or reads data from the memory area corresponding to the first address value.

According to the operation of FIG. 5, since a new random key is generated in every power cycle and an address of an NVRAM for data writing or reading is converted to another address using the random key, the areas of the NVRAM are evenly worn by wear leveling. Furthermore, if data writing to or data reading from a specific memory area preset to store a basic program such as firmware has been requested, the address of the specific memory area of the NVRAM 131 is directly provided to the NVRAM 131, without being converted to another address. Therefore, the address of an area preset for a basic program of the terminal is kept unchanged. In addition, when the terminal returns to a previous state upon power-on in the power saving mode like hibernation, address mapping is performed using a previous random key instead of a new random key. Thus converted addresses of the NVRAM are maintained.

Figure 6:
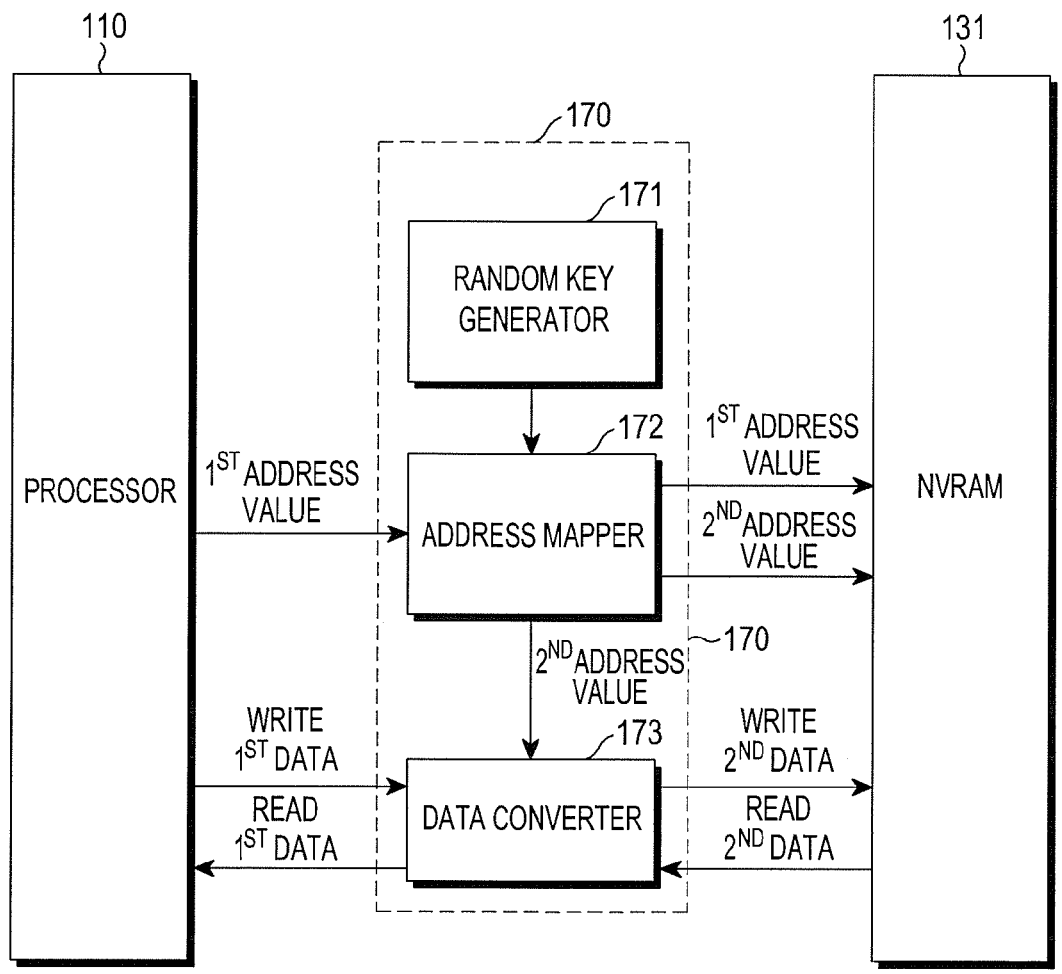
FIG. 6 illustrates a block diagram of an apparatus of converting an address and data of a memory in a terminal according to another exemplary embodiment of the present disclosure.

FIG. 6 illustrates a block diagram of an apparatus of converting an address and data of a memory in a terminal according to the second exemplary embodiment of the present disclosure.

Referring to FIG. 6, the memory address and data conversion apparatus includes the processor 110, the conversion unit 170, and the NVRAM 131.

Upon receipt of a data write/read request along with execution of a specific application, the processor 110 transmits an address corresponding to a memory area of the NVRAM 131, which data will be written to or read from, to the conversion unit 170.

The conversion unit 170 includes the random key generator 171, the address mapper 172, and a data converter 130.

Each time the terminal is powered on, the random key generator 171 generates a new random key and transmits the new random key to the address mapper 172. The random key may be a number.

If the terminal is powered on in a power saving mode, the random key generator 172 may not generate a new random key or may generate the same random key as a previous random key and transmit the generated random key to the address mapper 172. In the power saving mode, after a current state is written to a memory, the terminal is powered off, like hibernation. Then when the terminal is powered on again, the written data is all read and recovered, thus returning the memory to an original state. In addition, on-going programs still run as if nothing occurred.

Accordingly, when the terminal is powered on in the power saving mode, the random key generator 171 may not generate a new random key or may generate the same random key as a previous random key and transmit the generated random key to the address mapper 172.

The address mapper 172 receives the random key from the random key generator 171.

Upon receipt of a first address value of a specific memory area which data is to be written to or read from the processor 110, the address mapper 172 converts the first address value to a second address value using the random key and transmits the second address value to the data converter 173 and the NVRAM 131.

The second address value may be created using the random key by equation (1).

The address mapper 172 converts the first address value to the second address value in a one-to-one correspondence using the random key received from the random key generator 171. Each time the address mapper 172 receives a random key from the random key generator 171, the address mapper 172 converts the first address value to a different second address value using the received random key. As the random key generator 171 generates a new random key in every power cycle, the address mapper 172 receives the new random key from the random key generator 171 and thus converts the first address value of the memory area to a new second address value using the new random key, for data writing or reading.

If the address mapper 172 does not receive a random key from the random key generator 171, the address mapper 172 performs address mapping using a previous random key.

If a first address value corresponding to a memory area which data is to be written to or read from, received from the processor is a predetermined address corresponding to a predetermined memory area in which a basic program such as firmware is to be stored, the address mapper 172 simply outputs the first address value to the NVRAM 131, without address conversion.

The address mapper 172 converts the first address value to the second address value by equation (1) and transmits the second address value to the data converter 130.

Upon receipt of first data to be written from the processor 110, the data converter 173 converts the first data to second data using the second address value received from the address mapper 172 and transmits the second data to the NVRAM 131.

Upon receipt of second data from the NVRAM 131 in response to a request of reading first data from the processor 110, the data converter 173 converts the second data to the first data using a second address value and transmits the first data to the processor 100.

The data converter 173 may convert the second data to the first data or convert the first data to the second data by equation (2). In equation (2), the first data is original data and the second data is converted data.

$$\text{Second data} = \text{first data} + \text{second address value}$$

$$\text{First data} = \text{second data} - \text{second address value} \quad (2)$$

While conversion between the first and second data is performed by addition and subtraction in equation (2) in the exemplary embodiment of the present disclosure, the first data and the second data may be converted to each other by any other operation that recovers the result of processing data to be written to original data.

Upon receipt of second data and a second address value for data writing from the conversion unit 170, the NVRAM 131 writes the second data in a memory area corresponding to the second address value.

Upon receipt of a second address value for data reading from the conversion unit 170, the NVRAM 131 reads second data from a memory area corresponding to the second address value and transmits the second data to the conversion unit 170.

Upon receipt of second data to be written and a first address value for writing the second data from the conversion unit 170, the NVRAM 131 writes the second data in a memory area corresponding to the first address value.

Upon receipt of a first address value for data reading from the conversion unit 170, the NVRAM 131 reads second data from a memory area corresponding to the first address value and transmits the second data to the conversion unit 170.

The conversion unit 170 may be configured separately or incorporated into the processor 110 or the NVRAM 131.

If the conversion unit 170 is incorporated into the processor 110, the processor 110 converts a first address value corresponding to a memory area which first data is to be written to or read from to a second address value through the conversion unit 170, converts the first data to second data through the conversion unit 170, and transmits the second address value and the second data to the NVRAM 131.

The processor 110 converts a first address value corresponding to a memory area from which first data is to be read to a second address value through the conversion unit 170 and transmits the second address value to the NVRAM 131. Upon receipt of second data read from a memory area corresponding to the second address value from the NVRAM 131, the processor 110 converts the second data to the first data through the conversion unit 170.

If a first address value corresponding to the memory area to which first data is to be written is a predetermined address excluded from address conversion, the processor 110 converts the first data to second data through the conversion unit 170 and transmits the first address value and the second data to the NVRAM 131.

If a first address value corresponding to a memory area from which first data is to be read is a predetermined address excluded from address conversion, the processor 110 transmits the first address value to the NVRAM 131. Upon receipt of second data read from the memory area corresponding to the first address value from the NVRAM 131, the processor 110 converts the second data to the first data through the conversion unit 170.

If the conversion unit 170 is incorporated into the NVRAM 131, the processor 110 transmits a first address value corresponding to a memory area which first data is to be written to or read from to the NVRAM 131.

Upon receipt of a first address value corresponding to a memory area to which first data is to be written from the processor 110, the NVRAM 131 converts the first address value to a second address value and the first data to second data through the conversion unit 170 and writes the second data to a memory area corresponding to the second address value.

Upon receipt of a first address value corresponding to a memory area from which first data is to be read from the processor 110, the NVRAM 131 converts the first address value to a second address value and converts second data stored in a memory area corresponding to the second address value to the first data through the conversion unit 170 and transmits the first data to the processor 110.

If a first address value corresponding to a memory area to which first data is to be written is a predetermined address excluded from address mapping, the NVRAM 131 converts the first data to second data through the conversion unit 170 and writes the second data to the memory area corresponding to the first address value.

If a first address value corresponding to a memory area from which first data is to be read is a predetermined address excluded from address conversion, the NVRAM 131 converts second data stored in the memory area corresponding to the first address value to the first data through the conversion unit 170 and transmits the first data to the processor 110.

In the case where the conversion unit 170 is configured separately in the terminal as illustrated in FIG. 6, operations of converting an address of the NVRAM 131 will be described in greater detail with reference to FIGS. 7, 8 and 9.

Figure 7:
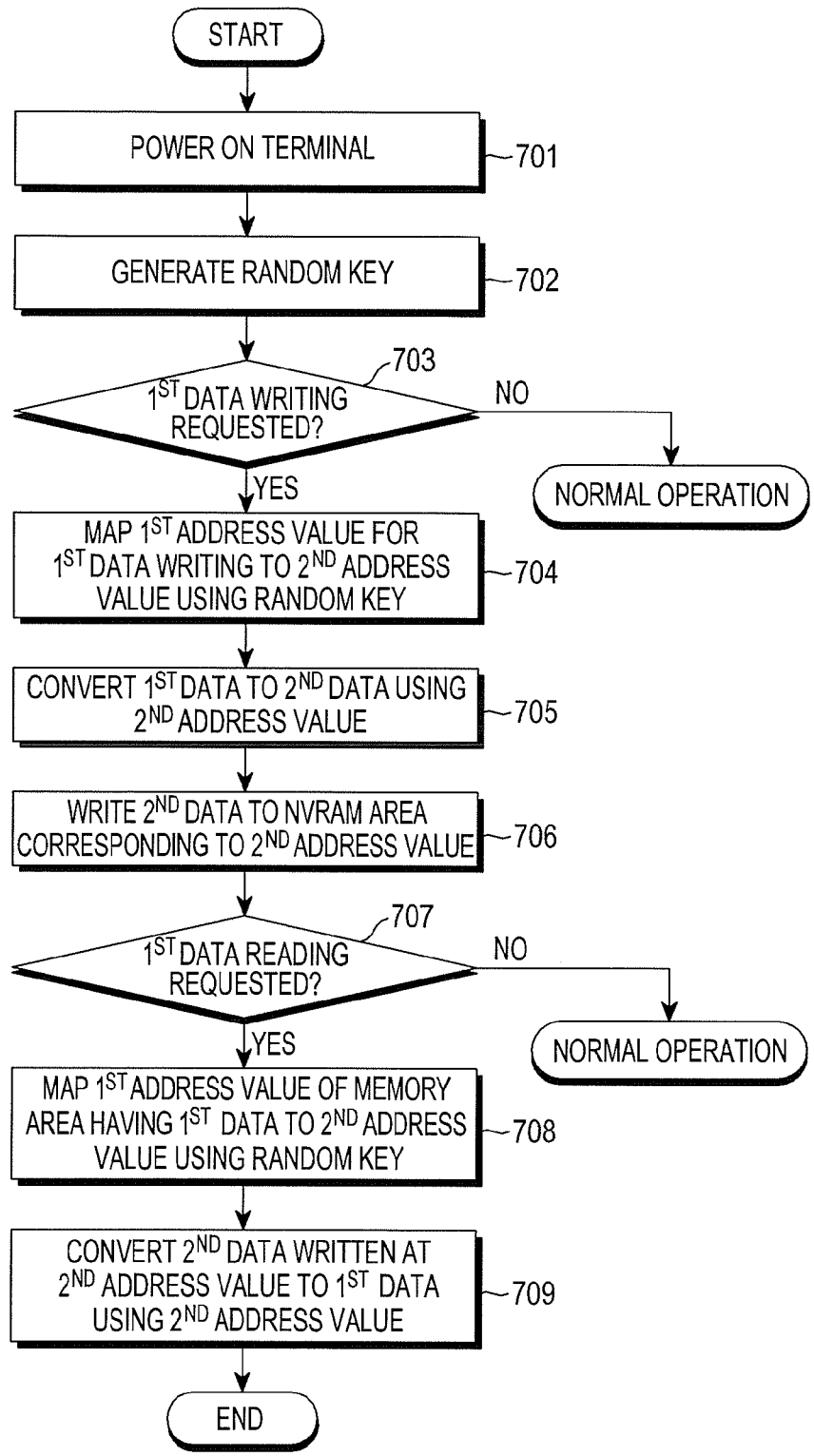
FIG. 7 illustrates a flowchart for a first memory address and data conversion operation in a terminal according to the second exemplary embodiment of the present disclosure.

FIG. 7 illustrates a flowchart for a first memory address and data conversion operation in a terminal according to the second exemplary embodiment of the present disclosure.

The first memory address and data conversion operation according to the second exemplary embodiment of the present disclosure will be described in detail with additional reference to FIGS. 1 and 6.

Referring to FIG. 7, when the terminal is powered on in step 701, the random key generator 171 generates a new random key and transmits the new random key to the address mapper 172 in step 702.

Upon receipt of a request of writing first data along with execution of a specific application in step 703, the processor 110 transmits a first address value corresponding to a memory area to which the first data is to be written to the address mapper 172 of the conversion unit 170 and transmits the first data to the data converter 173 of the conversion unit 170.

In step 704, the address mapper 172 converts the first address value to a second address value using the random key received in step 702, for example, by equation (1). The address mapper 172 transmits the second address value to the data converter 173 and the NVRAM 131.

The data converter 173 converts the first data received from the processor 110 to second data using the second address value received from the address mapper 172, for example, by equation (2) and transmits the second data to the NVRAM 131 in step 705.

Upon receipt of the second address value from the address mapper 172 and the second data from the data converter 173, the NVRAM 131 writes the second data to a memory area corresponding to the second address value in step 706.

Subsequently, upon receipt of a request of reading the first data along with execution of the specific application in step 707, the processor 110 transmits the first address value corresponding to the memory area from which the first data is to be read to the address mapper 172 of the conversion unit 170. The address mapper 172 onverts the first address value to the second address value using the random key received in step 702, for example, by equation (1) in step 708.

The address mapper 172 transmits the second address value to the NVRAM 131 and the data converter 173.

The NVRAM 131 reads the second data from the memory area corresponding to the received second address value and transmits the second data to the data converter 173.

The data converter 173 converts the second data received from the NVRAM 131 to the first data using the second address value received from the address mapper 172, for example, by equation (2) and transmits the first data to the processor 110, thus completing the reading operation of the first data in step 709.

According to the operation illustrated in FIG. 7, data can be protected by generating a random key in every power cycle and writing/reading data using the random key.

For example, upon power-on of the terminal, a first random key is generated and a first address value for use in writing first data (a) is converted to a second address value using the first random key. Then the first data (a) is converted to second data (b) using the second address value and the second data (b) is written to the NVRAM. In addition, the second data (b) may be converted to the first data (a) using the second address value. Thus, the original first data (a) may be read from the NVRAM.

However, when the terminal is powered off and then powered on, the NVRAM is also turned off and then turned on. Accordingly, a new random key, that is, a second random key is generated from the random key generator.

In the case where the first data (a) still remains in the NVRAM, upon request of reading the first data (a), the first address value for use in reading the first data (a) is converted to a third address using the second random key. Instead of the second data (b) converted to the remaining first data (a), third data (c) is read using the third address. Consequently, the data still remaining on the NVRAM despite power-on and then power-off of the NVRAM is not read.

Figure 8:
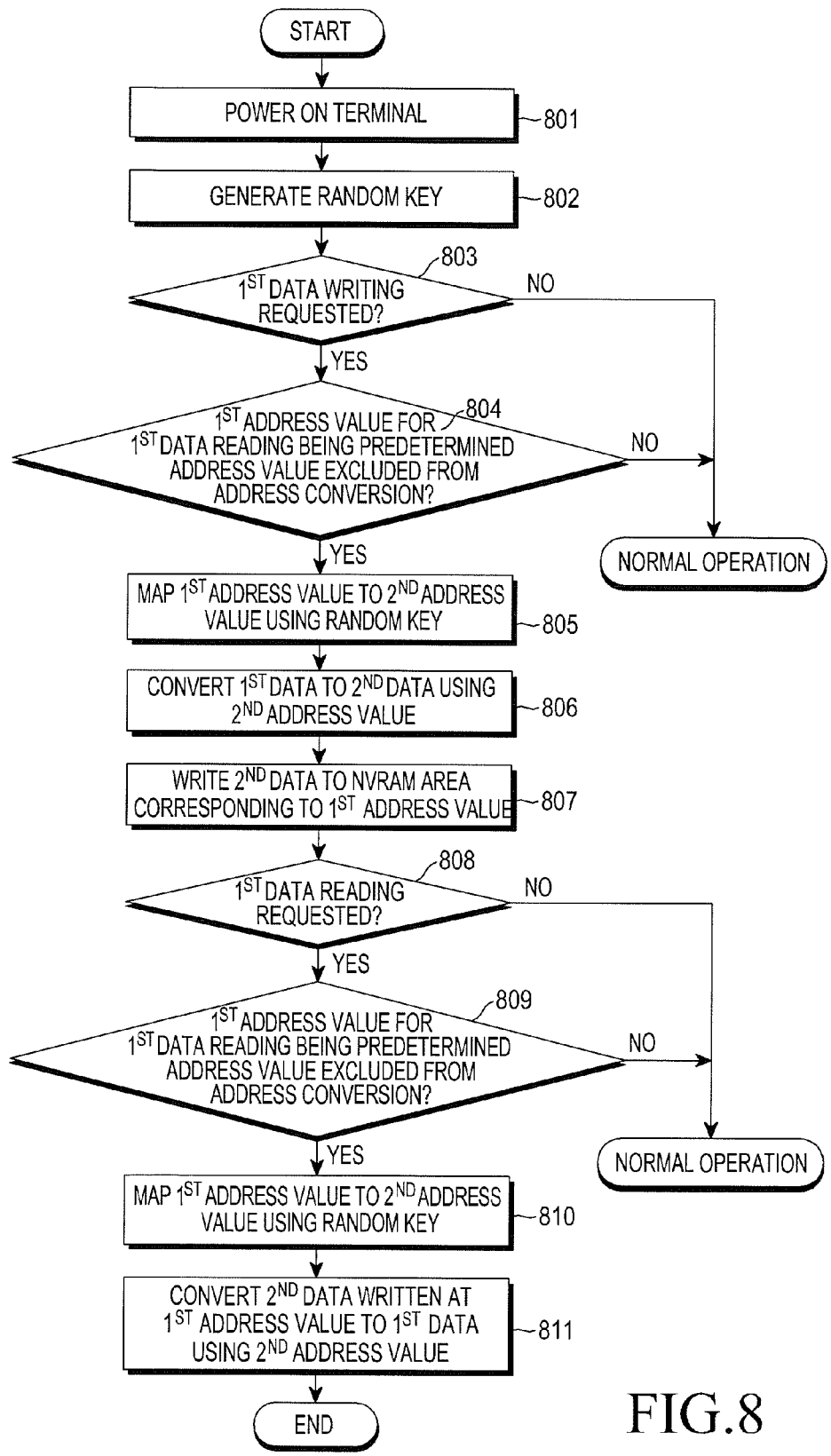
FIG. 8 illustrates a flowchart for a second memory address and data conversion operation in a terminal according to the second exemplary embodiment of the present disclosure.

FIG. 8 illustrates a flowchart for a second memory address and data conversion operation in a terminal according to the second exemplary embodiment of the present disclosure.

The second memory address and data conversion operation according to the second exemplary embodiment of the present disclosure will be described in detail with additional reference to FIGS. 1 and 6.

Referring to FIG. 8, when the terminal is powered on in step 801, the random key generator 171 generates a new random key and transmits the new random key to the address mapper 172 in step 802.

Upon receipt of a request of writing first data along with execution of a specific application in step 803, the processor 110 transmits a first address value corresponding to a memory area to which the first data is to be written to the address mapper 172 of the conversion unit 170 and transmits the first data to the data converter 173 of the conversion unit 170.

If it is determined that the received first address value is a predetermined address excluded from address conversion in step 804, the address mapper 172 transmits the first address value to the NVRAM 131 without address conversion. The predetermined address excluded from address mapping is an address corresponding to a specific area in which a basic program such as firmware is to be stored.

For data conversion, the address mapper 172 converts the first address value to a second address value using the random key received in step 802, for example, by equation (1) in step 805.

The address mapper 172 transmits the second address value to the data converter 173, and transmits the first address value to the NVRAM 131.

The data converter 173 converts the first data received from the processor 110 to second data using the second address value received from the address mapper 172, for example, by equation (2) and transmits the second data to the NVRAM 131 in step 806.

Upon receipt of the first address value from the address mapper 172 and the second data from the data converter 173, the NVRAM 131 writes the second data to the memory area corresponding to the first address value in step 807.

Subsequently, upon receipt of a request of reading the first data along with execution of the specific application in step 808, the processor 110 transmits the first address value corresponding to the memory area from which the first data is to be read to the address mapper 172 of the conversion unit 170. If it is determined that the received first address value is a predetermined address excluded from address mapping in step 809, the address mapper 172 transmits the first address value to the NVRAM 131 without address mapping.

For data conversion, the address mapper converts the first address value to the second address value using the random key received in step 802, for example, by equation (1) in step 810.

The address mapper 172 transmits the second address value to the data converter 173.

The NVRAM 131 reads the second data from the memory area corresponding to the received first address value and transmits the second data to the data converter 173.

The data converter 173 converts the second data received from the NVRAM 131 to the first data using the second address value received from the address mapper 172, for example, by equation (2) and transmits the first data to the processor 110, thus completing the reading operation of the first data in step 811.

Figure 9:
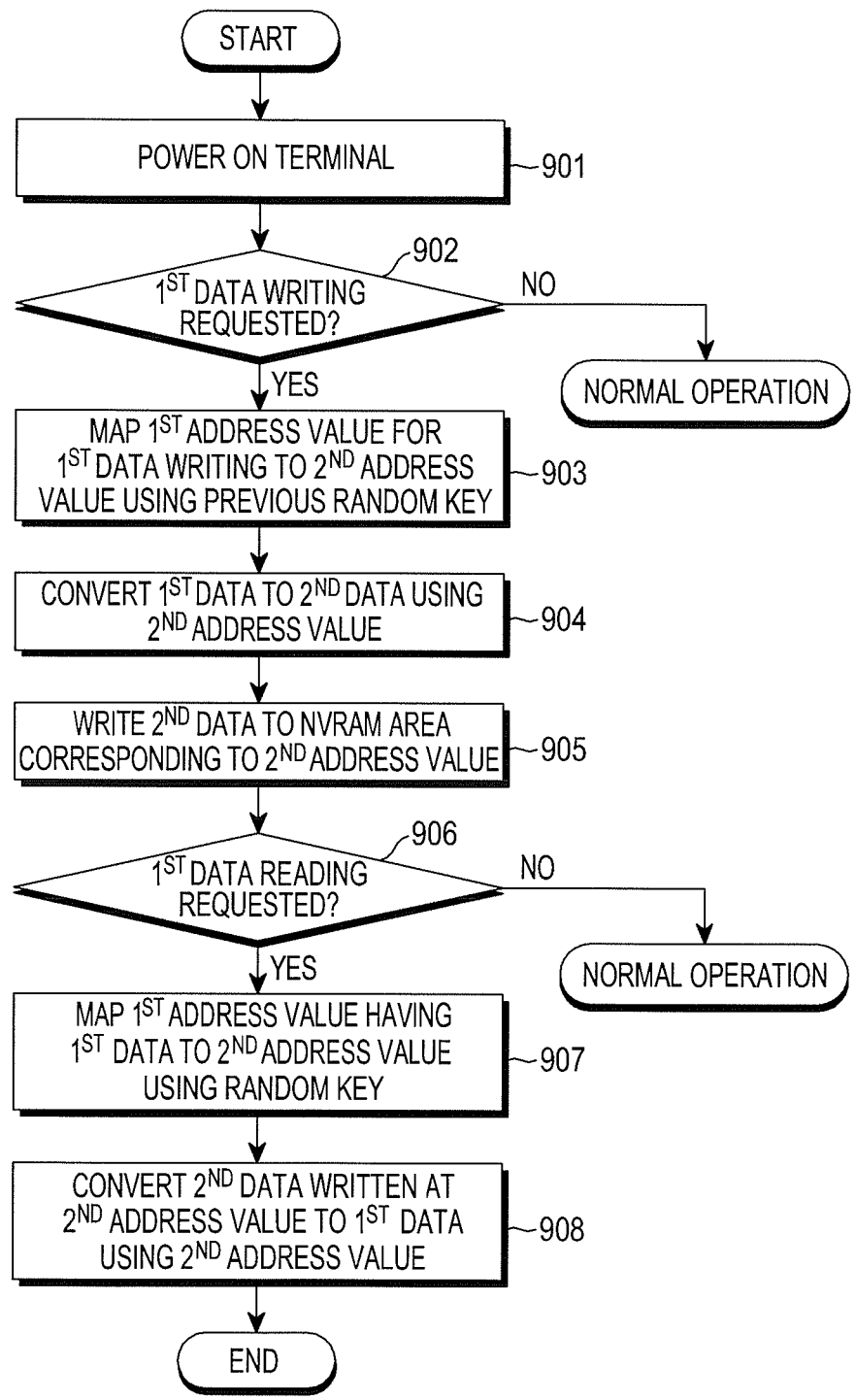
FIG. 9 illustrates a flowchart for a third memory address and data conversion operation in a terminal according to the second exemplary embodiment of the present disclosure.

FIG. 9 illustrates a flowchart for a third memory address and data conversion operation in a terminal according to the second exemplary embodiment of the present disclosure.

The third memory address and data conversion operation according to the second exemplary embodiment of the present disclosure will be described in detail with additional reference to FIGS. 1 and 6.

Referring to FIG. 9, when the terminal is powered on in a power saving mode in step 901, the random key generator 171 does not generate a new random key or generates the same random key as a previous random key and transmits the random key to the address mapper 172, because the terminal is supposed to read all written data and recover the data to the data's original state in the power saving mode, like hibernation.

Upon receipt of a request of writing first data along with execution of a specific application in step 902, the processor 110 transmits a first address value corresponding to a memory area to which the first data is to be written to the address mapper 172 of the conversion unit 170 and transmits the first data to the data converter 173 of the conversion unit 170.

In step 903, the address mapper 172 converts the first address value to a second address value using the previous random key or the random key received from the random key generator 171, for example, by equation (1).

The address mapper 172 transmits the second address value to the data converter 173 and the NVRAM 131.

The data converter 173 converts the first data received from the processor 110 to second data using the second address value received from the address mapper 172, for example, by equation (2) and transmits the second data to the NVRAM 131 in step 904.

Upon receipt of the second address value from the address mapper 172 and the second data from the data converter 173, the NVRAM 131 writes the second data to a memory area corresponding to the second address value in step 905.

Subsequently, upon receipt of a request of reading the first data along with execution of the specific application in step 906, the processor 110 transmits the first address value corresponding to the memory area from which the first data is to be read to the address mapper 172 of the conversion unit 170. The address mapper converts the first address value to the second address value using the previous random key or the random key identical to the previous random key, received from the random key generator 171, for example, by equation (1) in step 907.

The address mapper 172 transmits the second address value to the data converter 173 and the NVRAM 131.

The NVRAM 131 reads the second data from the memory area corresponding to the received second address value and transmits the second data to the data converter 173.

The data converter 173 converts the second data received from the NVRAM 131 to the first data using the second address value received from the address mapper 172, for example, by equation (2) and transmits the first data to the processor 110, thus completing the reading operation of the first data in step 908.

As is apparent from the above description, if an NVRAM is used as a main memory, the present disclosure can evenly wear all cells of the memory by providing the forgoing memory address conversion apparatus and method. Without a mapping table for address mapping, no time delay occurs to address mapping. Therefore, a deterministic operation of the main memory is not affected. Furthermore, when the NVRAM is powered off and then powered on, data remaining on the NVRAM is not exposed to an unauthorized third party. Therefore, the data of the NVRAM is protected.

At this point it should be noted that the exemplary embodiments of the present disclosure as described above typically involve the processing of input data and the generation of output data to some extent. This input data processing and output data generation may be implemented in hardware or software in combination with hardware. For example, specific electronic components may be employed in a mobile device or similar or related circuitry for implementing the functions associated with the exemplary embodiments of the present disclosure as described above. Alternatively, one or more processors operating in accordance with stored instructions may implement the functions associated with the exemplary embodiments of the present disclosure as described above. If such is the case, it is within the scope of the present disclosure that such instructions may be stored on one or more processor readable mediums. Examples of the processor readable mediums include Read-Only Memory (ROM), Random-Access Memory (RAM), CD-ROMs, magnetic tapes, floppy disks, and optical data storage devices. The processor readable mediums can also be distributed over network coupled computer systems so that the instructions are stored and executed in a distributed fashion. Also, functional computer programs, instructions, and instruction segments for accomplishing the present disclosure can be easily construed by programmers skilled in the art to which the present disclosure pertains.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An apparatus for converting a memory address in a terminal, the apparatus comprising:
a random key generator configured to generate a new random key each time the terminal is powered on;
an address mapper configured to convert an address of a memory area for data writing or reading using the generated random key and transmit the converted address to a memory, to write data to or read data from the memory area corresponding to the converted address, the memory configured to, in response to receipt of the converted address from the address mapper, write data to or read data from the memory area corresponding to the converted address; and
a processor configured to extract the address of the memory area for data writing or reading and transmit the extracted address to the address mapper,
wherein if the address of the memory area for data writing or reading is a predetermined address excluded from address conversion, the processor is configured to transmit the address to the memory, to write data to or read data from the memory area corresponding to the address, without transmitting the address to the address mapper.

2. The apparatus of claim 1, wherein when the terminal is powered on in a power saving mode, the random key generator is configured to not generate a random key.

3. The apparatus of claim 1, wherein when the terminal is powered on in a power saving mode, the random key generator is configured to generate a same random key as a previous random key.

4. The apparatus of claim 1, wherein the address mapper is configured to convert a first address value of a memory area for data writing or reading to a second address value using the generated random key and transmit the second address value to the memory.

5. The apparatus of claim 4, wherein the address mapper is configured to convert the first address value to the second address value using the generated random key in a one-to-one correspondence.

6. The apparatus of claim 4, wherein each time the new random key is generated, the address mapper is configured to convert the first address value to a different second address value using the new random key.

7. The apparatus of claim 1, wherein upon receipt of the address from the processor, the memory is configured to write data to or read data from the memory area corresponding to the address.

8. The apparatus of claim 1, wherein at least some components of the random key generator and the address mapper are implemented by a processor.

9. The apparatus of claim 1, wherein at least some components of the random key generator and the address mapper are included in the memory.

10. The apparatus of claim 1, wherein the memory is a Non-Volatile Random Access Memory (NVRAM).

11. An apparatus for converting an address and data of a memory in a terminal, the apparatus comprising:
a random key generator configured to generate a new random key each time the terminal is powered on;
an address mapper configured to convert an address of a memory area for data writing or reading using the generated random key and transmit the converted address to a data converter; and
the data converter configured to;
convert data, using the converted address, to be written to the memory; and
convert data, using the converted address, read from the memory, to original data.

12. The apparatus of claim 11, wherein when the terminal is powered on in a power saving mode, the random key generator is configured to not generate a random key or generate a same random key as a previous random key.

13. The apparatus of claim 11, wherein the address mapper is configured to map a first address value of a memory area to a second address value using the generated random key and transmit the second address value to the memory and the data converter.

14. The apparatus of claim 11, wherein if a first address value of a memory area is a predetermined address excluded from address conversion, the address mapper is configured to transmit the first address value to the memory, map the first address value to a second address value using the generated random key, and transmit the second address value to the data converter.

15. The apparatus of claim 13, wherein the address mapper is configured to map the first address value to the second address value using the generated random key in a one-to-one correspondence.

16. The apparatus of claim 13, wherein each time a new random key is generated, the address mapper is configured to map the first address value to a different second address value using the new random key.

17. The apparatus of claim 11, further comprising:
a processor configured to transmit data to be written to the memory to the data converter and transmit an address of a memory area for data writing or reading to the address mapper, and
the memory configured to write converted data received from the data converter to a memory area corresponding to a converted address received from the address mapper, extract converted data from a memory area corresponding to a converted address received from the address mapper, and transmit the extracted data to the data converter.

18. The apparatus of claim 17, wherein if data writing is requested, the memory is configured to write the converted data received from the data converter in the memory area corresponding to the address received from the address mapper, and if data reading is requested, the memory is configured to extract the converted data from the memory area corresponding to the address received from the address mapper.

19. The apparatus of claim 11, wherein at least some components of the random key generator, the address mapper, and the data converter are implemented by a processor.

20. The apparatus of claim 11, wherein at least some components of the random key generator, the address mapper, and the data converter are included in the memory.

21. The apparatus of claim 11, wherein the memory is a Non-Volatile Random Access Memory (NVRAM).

22. A method of converting an address of a memory in a terminal, the method comprising:
generating a new random key when the terminal is powered on;
converting an address of a memory area for data writing or reading using the generated random key, wherein the conversion comprises:
receiving a first address value of the memory area for data writing or reading to a second address value;
converting the first address value to a second address value using the generated random key; and
if the first address value of the memory area for data writing or reading is a predetermined address excluded from address conversion, writing or reading data to or from the memory area corresponding to the first address value, without converting the first address to the second address; and
writing data to or reading data from a memory area corresponding to the converted address.

23. The method of claim 22, wherein generating the new random key comprises generating a new random key each time the terminal is powered on.

24. The method of claim 22, further comprising:
generating no random key if the terminal is powered on in a power saving mode; and
converting an address of a memory area for data writing or reading using a random key generated before the power saving mode.

25. The method of claim 22, further comprising generating a same random key as a previous random key if the terminal is powered on in a power saving mode.

26. The method of claim 22, wherein converting the first address value to the second address value comprises converting the first address value to the second address value using the random key in a one-to-one correspondence.

27. The method of claim 22, wherein each time a new random key is generated, converting the first address value to the second address value comprises converting the first address value to a different second address value using the new random key.

28. The method of claim 22, wherein the memory is a Non-Volatile Random Access Memory (NVRAM).

29. A method of converting an address and data of a memory in a terminal, the method comprising:
generating a new random key when the terminal is powered on;
converting an address of a memory area for data writing or reading using the random key;
converting data, using the converted address, to be written to the memory and writing the converted data in a memory area corresponding to the converted address in response to request of data writing; and
extracting the converted data from the memory area corresponding to the converted address and converting the extracted data to original data, using the converted address, in response to request of data reading.

30. The method of claim 29, wherein generating the new random key comprises generating a new random key each time the terminal is powered on.

31. The method of claim 29, further comprising:
generating no random key if the terminal is powered on in a power saving mode; and
converting an address of a memory area for data writing or reading using a random key generated before the power saving mode.

32. The method of claim 29, further comprising generating a same random key as a previous random key if the terminal is powered on in a power saving mode.

33. The method of claim 29, wherein converting the address of the memory area for data writing or reading comprises:
receiving a first address value of the memory area for data writing or reading to a second address value;
converting the first address value to the second address value using the random key.

34. The method of claim 29, wherein converting data to be written to the memory using the converted address and writing the converted data in the memory area corresponding to the converted address comprises:
converting first data to be written to second data using a converted second address value, in response to request of data writing; and
storing the second data in a memory area corresponding to the second address value.

35. The method of claim 29, wherein converting data to be written to the memory using the converted address and writing the converted data in the memory area corresponding to the converted address comprises:

converting first data to be written to second data using a converted second address value in response to request of data writing; and storing the second data in a memory area corresponding to the address of the memory area for data writing or reading if the address is excluded from address conversion.

36. The method of claim 29, wherein extracting the converted data from the memory area corresponding to the converted address and converting the extracted data to original data comprises:

extracting converted second data from a memory area corresponding to a converted second address value in response to request of data reading; and converting the second data to first data being original data.

37. The method of claim 29, wherein extracting the converted data from the memory area corresponding to the converted address and converting the extracted data to original data comprises:

extracting converted second data from a memory area corresponding to a first address value in response to request of data reading if the first address value is excluded from address conversion; and converting the second data to first data being original data.

38. The method of claim 33, wherein converting the address of the memory area for data writing or reading comprises converting the first address value to the second address value using the generated random key in a one-to-one correspondence.

39. The method of claim 33, wherein each time a new random key is generated, converting the first address value to the second address value comprises converting the first address value to a different second address value using the new random key.

40. The method of claim 29, wherein the memory is a Non-Volatile Random Access Memory (NVRAM).

* * * * *